United States Patent
Yang et al.

(10) Patent No.: US 6,800,580 B1
(45) Date of Patent: Oct. 5, 2004

(54) METHOD FOR PRODUCING AN IMPROVED CATALYST FOR HOMO-AND CO-POLYMERIZATION OF OLEFIN

(75) Inventors: Chun Byung Yang, Taejeon-shi (KR); Mie Ock Kim, Taejeon-shi (KR)

(73) Assignee: Samsung General Chemicals Co., Ltd., Chungman Province (KR)

( * ) Notice: Subject to any disclaimer, the term of this patent is extended or adjusted under 35 U.S.C. 154(b) by 0 days.

(21) Appl. No.: 10/111,205

(22) PCT Filed: Oct. 23, 1999

(86) PCT No.: PCT/KR99/00637

§ 371 (c)(1),
(2), (4) Date: Sep. 3, 2002

(87) PCT Pub. No.: WO01/32718

PCT Pub. Date: May 10, 2001

(51) Int. Cl.$^7$ .......................... B01J 31/00; B01J 37/00; C06F 4/02; C06F 4/60
(52) U.S. Cl. ................. 502/103; 502/104; 502/110; 502/113; 502/115; 502/116; 502/118; 502/121; 502/122; 502/126; 502/132; 502/133
(58) Field of Search ................. 502/103, 104, 502/110, 113, 115, 116, 118, 121, 122, 126, 132, 133

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scata et al. |
| 4,226,963 A | 10/1980 | Giannini et al. |
| 4,263,169 A | 4/1981 | Scata et al. |
| 4,277,372 A | 7/1981 | Matlack |
| 4,315,835 A | 2/1982 | Scata et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,399,054 A | 8/1983 | Ferraris et al. |
| 4,401,589 A | 8/1983 | Kioka et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |

(List continued on next page.)

FOREIGN PATENT DOCUMENTS

| | | |
|---|---|---|
| DE | 3636060 | 5/1988 |
| EP | 131832 | 5/1987 |
| EP | 0 350 170 | 3/1994 |
| EP | 0 606 125 | 5/1997 |
| EP | 0 602 922 | 1/1998 |
| GB | 1335887 | 10/1973 |
| GB | 1492618 | 8/1978 |
| GB | 1577643 | 10/1980 |
| JP | 52-111528 | 9/1977 |
| JP | 09-176226 | 7/1995 |
| WO | 0132718 | 5/2001 |

OTHER PUBLICATIONS

Tinkler et al., "Polymerisaion of ethene by the novel titanium complex [Ti(Me$_3$SiNCH$_2$NsiMe$_3$)Cl$_2$]; a metallocene analogue," Chem. Commun., 1996, pp. 2623–2624.

Edelmann, "N–silylated benzamidines: versatile building blocks in main group and coordination Chemistry," Coordination Chemistry Reviews, vol. 137, 1994, pp. 403–481.

(List continued on next page.)

*Primary Examiner*—Mark L. Bell
*Assistant Examiner*—Jennine Brown
(74) *Attorney, Agent, or Firm*—Meyertons, Hood, Kivlin, Kowert & Goetzel, P.C.; Eric B. Meyertons

(57) ABSTRACT

The present invention relates to a solid complex titanium catalyst for homo-polymerization and co-polymerization of α-olefin, obtained by (i) producing a solution of a magnesium compound by dissolving a magnesium compound and a compound of IIIA Group of the Periodic Table in a solvent mixed with cyclic ether, one or more types of alcohol, a phosphorous compound, and an organosilane, (ii) precipitating the solid particles by reacting said magnesium solution with a compound of a transition metal, a silicon compound, or the mixture thereof, and (iii) reacting said precipitated solid particles with a titanium compound and an electron donor. The catalyst of the present invention is of large particle size, narrow particle distribution, and high catalytic activity, while the polymers obtained with the use of this catalyst are of excellent stereoregularity.

15 Claims, No Drawings

U.S. PATENT DOCUMENTS

| | | |
|---|---|---|
| 4,614,727 A | 9/1986 | Longi et al. |
| 4,642,328 A | 2/1987 | Morterol et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbé et al. |
| 4,988,656 A | 1/1991 | Arzoumanidis et al. |
| 4,990,479 A | 2/1991 | Ishimaru et al. |
| 5,013,702 A | 5/1991 | Arzoumanidis et al. |
| 5,059,570 A | 10/1991 | Bailly et al. |
| 5,061,667 A | 10/1991 | Murata et al. |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,244,996 A | 9/1993 | Kawasaki et al. |
| 5,419,116 A | 5/1995 | Rast et al. |
| 5,459,116 A | 10/1995 | Ro et al. |
| 5,502,128 A | 3/1996 | Flores et al. |
| 5,585,317 A | 12/1996 | Sacchetti et al. |
| 5,587,440 A | 12/1996 | Ehlers et al. |
| 5,643,845 A | 7/1997 | Tajima et al. |
| 5,696,044 A | 12/1997 | Zakharov et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,880,056 A | 3/1999 | Tsutsui et al. |
| 5,936,049 A | 8/1999 | Kojoh et al. |
| 5,965,478 A | 10/1999 | Goto et al. |
| 5,968,862 A | 10/1999 | Abbott et al. |
| 6,034,025 A * | 3/2000 | Yang et al. .............. 502/126 |
| 6,051,666 A * | 4/2000 | Zakharov et al. ........ 526/125.3 |
| 6,066,702 A | 5/2000 | Ro et al. |
| 6,114,276 A | 9/2000 | Kong et al. |
| 6,214,759 B1 | 4/2001 | Chang et al. |
| 6,291,385 B1 | 9/2001 | Lee et al. |
| 6,559,250 B2 * | 5/2003 | Ro et al. ................. 526/124.3 |
| 2001/0031694 A1 | 10/2001 | Yang et al. |
| 2002/0037980 A1 | 3/2002 | Yang et al. |
| 2002/0045537 A1 | 4/2002 | Yang et al. |
| 2002/0120079 A1 | 8/2002 | Ro et al. |

OTHER PUBLICATIONS

Zhou et al., "Synthesis and Structure of Novel Bridged Dinulcear Indium Complexes," Inorg. Chem., 1996, vol. 35, pp. 1423–1424.

Zhou et al., "Bulky Amidinate Complexes of Tin(IV). Synthesis and Structure of $Sn(RNC(R+))NR)_2$ (R=Cyclohexyl, R'=H, Me; R=SiMe$_3$, R'=Bu)," Inorg. Chem., 1997, vol. 36, pp. 501–504.

Linden et al., "Polymerization of β–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.

Stokes et al., "Reactions of Cobaloxime Anions and /or Hydrides with Enynes as a New, General Route to 1,3–and 1,2–Dienylcobaloxime Complexes," Organometallics, 1996, vol. 15, pp. 2624–2632.

* cited by examiner

METHOD FOR PRODUCING AN IMPROVED CATALYST FOR HOMO-AND CO-POLYMERIZATION OF OLEFIN

TECHNICAL FIELD

The present invention relates to a catalyst component for polymerization or co-polymerization of α-olefin, or more particularly to a solid complex catalyst of superior catalytic activity and stereoregularity, which is supported in a carrier containing magnesium.

BACKGROUND OF THE INVENTION

So far, quite a few catalysts and polymerization processes relative to homo-polymerization or co-polymerization of olefin have been reported, but the development of new catalysts is further demanded both for the improvement of polymer properties and for the production of polymers of specific desired properties.

Magnesium-containing catalysts for polymerization of olefin are known to have high catalytic activity and accord good stereoregularity, and are also known to be suitable in gas phase polymerization. In catalysts used in gas phase polymerization, the shapes, sizes and distribution of the particles as well as their catalytic activity and the polymers' stereoregularity, are matters of importance in the interest of industrial operations. Especially it is important that catalysts of narrow particle size distribution be produced. Catalysts of broad particle size distributions need be avoided since catalysts of small particle sizes are apt to cause trouble in transit, and those of very large particle sizes may result in polymers like lumps or reels of strings while polymerizing. For instance, in order to produce impact-resistance copolymers of ethylene and propylene having high contents of ethylene, with the polymer's average particle size as large as 1,000 μm or so, the average particle size of the catalyst for co-polymerization should be in the range of 30 to 80 μm. The catalyst must also be of excellent mechanical strength against erosion during the polymerization process, and must be excellent enough in bulk density, too. Thus, in development of polymerization catalysts, a simple production process and yet of adjusted particle sizes of the catalysts can be important more than anything else.

The catalytic activity and the stereoregularity of polymerized α-olefin are very important fundamental property for a catalyst and therefore many researches of improving them have so far been performed. As a consequence, there is no longer a need in most industrial production of polyolefin, especially polypropylene, today for a separate process for removal of the residue and atactic component of the catalyst. However, as uses of polypropylene of better properties, especially the greater strength, are on the rise nowadays, development of catalysts of greater stereoregularity is acutely demanded to meet the ever-growing need for such.

Many magnesium-containing titanium-based catalysts for polymerization of olefin along with the production processes for such catalysts have been reported. Especially, quite a few processes making advantageous use of magnesium solutions for obtainment of olefin polymerization catalysts with adjusted particle size, as above, have been reported. Methods for obtainment of magnesium solutions by reacting magnesium compounds with such electron donors as alcohol, amine, cyclic ether, carboxylic acid in the presence of hydrocarbon solvents are known, of which, the cases wherein alcohol was used are mentioned in U.S. Pat. Nos. 4,330,649; 5,106,870. Now U.S. Pat. Nos. 4,315,874; 4,399, 054; 4,071,674; 4.439,540, too, have reported methods for production of magnesium solutions. Tetrahydrofuran, which is cyclic ether, has been in various uses as a complex compound of magnesium chloride (e.g. U.S. Pat. Nos. 4,277,372; 3,642,746; 3,647,772), as additive to co catalyst (U.S. Pat. Nos. 4,158,642; 4,148,756), and as a solvent (U.S. Pat. No. 4,477,639; 4,518,706).

U.S. Pat. Nos. 4,946,816; 4,866,022; 4,988,656; 5,013, 702, and 5,124,297 are all mutually interrelated, and the processes for production of catalysts revealed in these patents comprise: (i) producing a magnesium-containing solution from magnesium carboxylate or magnesium alkylcarbonate; (ii) precipitating said magnesium solution in the presence of a transition metal halide and organosilane additive, (iii) re-precipitating the precipitated solid component with the use of a liquid mixture containing tetrahydrofuran, and (iv) reacting said reprecipitated particles with transition metal component and an electron donor compound. But such methods as these are not free from inherent demerits of having to undergo too many steps in production of catalysts.

U.S. Pat. No. 4,330,649 describe that a magnesium solution is made by reacting a magnesium compound with alcohol, organic carboxylic acid, aldehyde, amine or their mixture in the presence of an organic hydrocarbon solvent, and the final catalytic substance is made by reacting the above solution with a titanium compound and an electron donor.

Meanwhile, U.S. Pat. Nos. 4,347,158; 4,422,957; 4,425, 257; 4,618,661; 4,680,381, commend a method for production of catalysts by grinding magnesium chloride, after adding thereto a Lewis acid compound like aluminum chloride. Although there have been some improvements on the catalytic activity, there yet remain some morphological irregularities in the shape, and broad size distribution, and also the stereoregularity needs to be improved.

SUMMARY OF THE INVENTION

As has been reviewed above, keen need is still felt for development of catalysts for olefin polymerization, which are simple in production process, high polymerization activity, large average particle size, narrow particle distribution, suitable in gaseous phase polymerization, and give the excellent stereoregularity of polymer obtained.

Disclosed herein is a solid catalyst for polymerization or co-polymerization of olefin, which shows high catalytic activity, large average particle size, narrow particle distribution, and improved stereoregularity.

Also disclosed is a simple process for production of a solid catalyst for polymerization or co-polymerization of olefin, which has high catalytic activity, excellent stereoregularity, large average particle size, and narrow particle distribution.

DETAILED DESCRIPTION OF THE PREFERRED EMBODIMENTS

The catalyst for polymerization or co-polymerization of olefin is produced by a simple and yet efficient production process that includes (i) production of a magnesium-containing solution from a mixture of a non-reducible magnesium compound and a compound of an element of IIIA Group of the Periodic Table, (ii) precipitation of the solid particles by reacting said magnesium solution with a transition metal compound, a silicon compound, or a mixture thereof and (iii) reacting said precipitated solid particles with a titanium compound and an electron donor, and washing them in a hydrocarbon solvent to obtain solid catalyst particles of excellent morphology.

The magnesium-containing solution is obtained by dissolving a non-reducible compound of magnesium and a compound of an element of IIIA Group of the Periodic Table in a solvent of a mixture of cyclic ether, one or more types of alcohol, a phosphorous compound, and organosilane in the presence or absence of a hydrocarbon solvent.

Of the types of non-reducible magnesium compounds used in production of the magnesium compound solution in the present invention are to be named, first, such halogenated magnesiums as magnesium chloride, magnesium iodide, magnesium fluoride, and magnesium bromide; such alkylmagnesium halides as methylmagnesium halide, ethylmagnesium halide, propylmagnesium halide, butylmagnesium halide, isobutylmagnesium halide, hexymagnesium halide, and amylmagnesium halide; such alkoxymagnesium halides as methoxymagnesium halide, ethoxymagnesium halide, isopropoxymagnesium halide, butoxymagnesium halide, and octoxymagnesium halide; such aryloxymagnesium halides as phenoxymagnesium halide and methylphenoxymagnesium halide; such alkoxymagnesiums as ethoxymagnesium, isopropoxymagnesium, butoxymagnesium, and octoxymagnesium; such aryloxymagnesiums as phenoxymagnesium and dimethylphenoxymagnesium; and such carboxylic acid magnesium salts as lauric acid magnesium and stearc acid magnesium. Of the above compounds mixtures of two or more of them may also be used. Besides, magnesium compounds can be used effectively in the form of a complex with another metal.

Of the compounds listed above, some can be represented by a simple formula but some others can't, at times, due to the different manners of production. In such latter cases, generally they can be regarded as mixtures of some of the listed compounds. For instance, such compounds as are obtained by reacting magnesium compounds with polysiloxane compounds, halogen-containing silane compounds, ester, or alcohol and such compounds as are obtained by reacting metallic magnesium with alcohol, phenol, or ether in the presence of halosilane, phosphorus pentachloride, or thionyl chloride are also usable in the present invention. But the preferable magnesium compounds are magnesium halides, especially magnesium chloride and alkylmagnesium chloride, preferably those having a $C_1$~$C_{10}$ alkyl group: alkoxymagnesium chloride, preferably those having a $C_1$~$C_{10}$ alkoxy group; and aryloxymagnesium chloride, preferably those having a $C_6$~$C_{30}$ aryloxy group.

As to the compound of an element of IIIA group of the Periodic Table used together with the magnesium compound in production of the magnesium compound, such boronic halides as boron fluoride, boron chloride, and boron bromide and such aluminum halides as aluminum fluoride, aluminum bromide, aluminum chloride, and aluminum iodide can be named, but an aluminum halide is preferable of them all, and especially aluminum chloride is the most preferable. The molar ratio of the magnesium compound to the compound of the element of IIIA Group of the Periodic Table is preferably less than 1:0.25, more preferably less than 1:0.15.

As to the types of the hydrocarbon solvents used here in the present invention when the magnesium solution is produced they include aliphatic hydrocarbons such as pentane, hexane, heptane, octane, decane, and kerosene; cyclic hydrocarbons such as cyclobenzene, methylkyclobenzene, cyclohexane, and methylcyclohexane; aromatic hydrocarbons such as benzene, toluene, xylene, ethylbenzene; halogenated hydrocarbons such as trichloroethylene, carbon tetrachloride, and chlorobenzene.

When magnesium compounds are transformed into magnesium solutions, a solvent of a mixture of cyclic ether, one or more types of alcohol a phosphoric compound and organosilane are used in the presence or absence of hydrocarbon, as has been stated above. For the cyclic ether that can be used in the present invention, such cyclic ether having two to 15 carbons, especially tetrahydrofuran, 2-methyl tetrahydrofuran tetrahydropyran can be named, but the most preferable is tetrahydrofuran. As for the types of alcohol such alcohols containing 1~20 carbon atoms as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl alcohol, the preferable being those that contain 1~12 carbon atoms. The average particle size of a desired catalyst and its particle distribution can vary according to the ratio of alcohol to cyclic ether, but to obtain the particle size catalyst claimed by the present invention the total quantity of alcohol and cyclic ether at the time of production of the magnesium solution is at least 0.5 mol per each mole of the magnesium compound, preferably about 1.0 mol~20 mol. and more preferably about 2.0 mol~10 mol. In case of less than 0.5 mol, the production of a magnesium solution itself is difficult. The molar ratio of cyclic ether to the one or more kinds of alcohol is 1:0.05 to 1:0.95.

The one or more types of alcohol used in the present invention can all or partly be used when dissolving the magnesium compound. For another method, the one or more types of alcohol can all or partly be added to the magnesium solution in which the magnesium has been dissolved. But when the magnesium solution is reacted with the transition metal compound to precipitate solid particles, in Step (ii), the total content of the alcohol of one or more types should be retained.

In practice, one or more types of alcohol preferably consist of alcohol of the relatively small molecular weight, that is, of 1 to 3 carbon atoms, and that of the relatively large molecular weight, that is, 4 to 20 carbon atoms. The molar ratio of the whole alcohol to the alcohol of the relatively small molecular weight is 1:0.01 to 1:0.40, preferably 1:0.01 to 1:025. The most preferable alcohol of the relatively small molecular weight is methanol or ethanol, while that of the relatively large molecular weight is butanol or 2-ethyl hexanol.

The phosphoric compound used in the present invention is represented by the following general formula

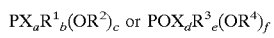

Here, X stands for a halogen atom, $R^1$, $R^2$, $R^3$, and $R^4$ for such a hydrocarbon with 1 to 20 carbon atoms as alkyl, alkenyl, aryl, each the same or different (a+b+c=3; $0 \leq a \leq 3$, $0 \leq b \leq 3$, $0 \leq c \leq 3$, d+e+f=3, $0 \leq d \leq 3$, $0 \leq e \leq 3$, $0 \leq f \leq 3$). They are, for instance, phosphorus trichloride, phosphorus tribromide, diethykhlorophosphite, diphenylchlorophosphite, diethylbromophosphite, diphenylbromophosphite, methyldichlorophosphite, phenylchlorophosphite, trimethylphosphite, triethylphosphite, trinomalbutylphosphite, trioctylphosphite, tridecylphosphite, triphenylphosphite, phosphorus oxychloride, triethylphosphite, trinomalbutylphosphite, triphenylphosphate, and, besides, other phosphoric compounds can also be used on condition that they satisfy one of the above formulae. The quantity of these for use is preferably 0.01 mol to 0.25 mol per each mole of the magnesium compound, more preferably 0.05 mol to 0.2 mol.

The organosilane used in production of the magnesium solution has a general formula: $R_n SiR^1_{4-n}$ (here R stands for hydrogen; or an alkyl, alkoxy, haloalkyl, or an aryl group having 1 to 10 carbons or a halosilyl or halosidyl alkyl group having 1 to 8 carbons; $R^1$, for OR or halogen; n=0~4) In particular, such organosilane includes trimethylchlorosilane, trimethylethoxysilane, dimethyldichlorosilane, tetraethoxysilane, and tetrabutoxysilane. The quantity of organsilane for use is adequately 0.01 mol to 0.25 mol per each mole of the magnesium compound, or preferably 0.05 mol to 0.2 mol.

At the time of production of the magnesium solution the reaction of the magnesium compound with mixed solvent of cyclic ether, alcohol, phosphoric compound and organosilane is preferably performed in a hydrocarbon medium, and the reaction temperature, though different according to the types and quantity of the cyclic ether, alcohol, phosphoric compound, and organosilane, is at the lowest about −25° C., preferably −10 to 200° C., more preferably about 0 to 150° C., preferably for about 30 minutes to three hours.

The thus produced magnesium compound solution is reacted with such a compound of transition metal of a general formula, $Ti(OR)_a X_{4-a}$ (R standing for hydrocarbon, X for a halogen atom, a for a figure of 0 to 4), as a titanium compound, to obtain precipitate of solid particles having certain regular shapes, large size, and a narrow particle size distribution. In the general formula R indicates an alkyl group having 1 to 10 carbon atoms. Such titanium compounds as satisfying the formula include such 4-halogenated titaniums as $TiCl_4$, $TiBr_4$, and $TiI_4$, such 3-halogenated alkoxy titaniums as $Ti(OCH_3)Cl_3$, $Ti(OC_2H_5)Cl_3$, $Ti(OC_2H_5)Br_3$, and $Ti(O(i-C_4H_9)Br_3$, such 2-halogenated alkoxy titaniums as $Ti(OCH_3)_2Cl_2$, $Ti(OC_2H_5)_2Cl_2$, $Ti(O(i-C_4H_9)Cl_2$, and $Ti(OC_2H_5)_2Br_2$, and such tetra-alkoxy titaniums as $Ti(OCH_3)_4$, $Ti(OC_2H_5)_4$, and $Ti(OC_4H_9)_4$. Mixtures of the above titanium compounds are also usable in the present invention. The preferable titanium compounds are halogen-containing titanium compounds, the more preferable being titanium tetrachloride.

The magnesium compound solution can also be made to precipitate solid particles of large average particle size and narrow particle distribution by the use of titanium compound or silicon compound or mixtures of silicon compound and titanium compound. The silicon compound can be represented by a general formulae $R_a SiR^1_{4-n}$. (here R stands for hydrogen; or an alkyl, alkoxy, haloalkyl, or an aryl group having 1 to 10 carbons; or a halosilyl or halosilyl alkyl having 1 to 8 carbons; $R^1$, for halogen; n=0–3). Silicon compounds satisfying the general formula include a tetra-halogenated silicon such as silicon tetrachloride; a trihalogenated silicon such as trichlorosilane, methyl trichlorosilane, ethyl trichlorosilane, phenyl trichlorosilane; a dihalogenated silicon such as dimethyl dichlorosilane, diethyl dichlorosilane, diphenyl dichlorosilane and methyl phenyl dichlorosilane; a mono-halogenated silicon such as trimethyl chlorosilane. The quantity of the titanium compound, silicon compound, or their mixture, used in precipitating the solution is adequately 0.1 to 200 mol per each mole of the magnesium compound, preferably 0.1 to 100 mol, more preferably 0.2 to 80 mol. When the magnesium compound solution is reacted with a titanium, silicon, or their mixture, the precipitated solid particles considerably vary in shape, size, and particle distribution according to the different reaction conditions. Thereupon, it is better to carry out the reaction of the magnesium solution with the titanium, silicon, or with a mixture of these, at a sufficiently low temperature, so that the solid precipitate is not formed too quickly but slowly. Preferably, the reaction is performed at −70–70° C., more preferably at −50–50° C. The temperature is gradually raised after the reaction so that the reaction will continue sufficiently at 50–150° C. for 0.5 hour–5 hours. In this way, a carrier of excellent shape and particle distribution is obtained.

The produced solids are reacted with a titanium compound in the presence of a proper electron donor. This reaction is carried out, typically, in two steps: first reacting the magnesium carrier with the titanium compound, or with the titanium compound and proper electron donor, and next separating the solid particles and reacting them one more time with a titanium compound and electron donor to be followed by separating the solid particles and drying them to obtain the intended catalyst.

The titanium compounds useful in reaction with the magnesium carrier obtained in the present invention are titanium halide and the halogenated alkoxy titaniums which have 1 to 20 carbons of the alkoxy, functional group. On occasions, mixtures of these can also be used. The preferable, of these, are titanium halide and such halogenated alkoxy titaniums having 1 to 8 carbons of the alkoxy functional group, and the most preferable is titanium tetrachloride.

For the electron donors suitable for use in the present invention for production of catalysts, compounds containing oxygen, nitrogen, sulfur, or phosphor can be named. These compounds include, for instance, organic acids, organic acid ester, alcohol, ether, aldehyde, ketone, amine, amine oxide, amide, ester phosphate, and mixtures of them. The preferable electron donors are aromatic esters and, more particularly, benzoic acid alkyl ester and halo benzoic acid ester such as methyl benzoate, methyl bromobenzoate ethyl benzoate, ethyl chlorobenzoate, ethyl bromobenzoate, butyl benzoate, isobutyl benzoate, hexyl benzoate, cyclohexyl benzoate, and such dialkyl phthalates having 2 to 10 carbons as diisobutyl phthalate, diethyl phthalate, ethylbutyl phthalate, and dibutyl phthalate are useful. These electron donors can be used in a mixture of two or more of them, or in a complex with other compounds. The quantity is 0.01 to 10 mol per each mole of the magnesium compound, preferably about 0.01 to 5 mol, and more preferably 0.05 to 2 mol.

The catalyst produced by the method provided by the present invention can be made advantageous use of in polymerization of such α-olefins as ethylene and propylene. Especially, this catalyst can be advantageously used in polymerization of such α-olefins having three or more carbons as propylene, 1-butene, 1-pentene, 4-methyl-1-pentene, and 1-hexene, in co-polymerization of these, in co-polymerization of ethylene with these, and in co-polymerization of these with poly-unsaturated compounds such as conjugate or nonconjugate dienes.

The polymerization reaction in the presence of the catalyst of the present invention is performed with the use of (i) the solid complex titanium catalyst of the present invention comprising magnesium, titanium, halogen, and an internal electron donor, (ii) a co-catalyst of a compound of an organic metal of II or III Group on the Periodic Table, and (iii) electron donor component comprising an organic silicon compound.

Before the polymerization reaction the solid complex titanium catalyst components of the present invention can be pre-polymerized. The said pre-polymerization is performed in the presence of such a hydrocarbon solvent as hexane at sufficiently low temperature and under the low pressure condition of α-olefin in the presence of the above catalyst components and such an organic aluminum compound as triethylaluminum and an organosilicon compound electron donor. Pre-polymerization, by wrapping up the catalytic particles with polymer, is helpful in making the shapes of the polymer. The ratio in weight of polymer to catalyst after the prepolymerization is ordinarily 0.1:1 to 20:1.

The organometallic compound useful as a cocatalyst when polymerization is performed with the use of the catalyst of the present invention can be represented by the general formula of $MR_n$, where, M stands for such metallic elements of Group II or IIIA of the Periodic Table as magnesium, calcium, zinc, boron, aluminum, and kalium, R standing for an alkyl group with 1 carbon~20 carbons as methyl, ethyl, butyl, hexyl, octyl, and decyl, n for the atomic value of a metal constituent. For the more preferable organometallic compounds such trialkyl aluminums having an alkyl group with 1 carbon~6 carbons as triethylaluminum and triisobutylaluminum and a mixture of these can be named. On occasions such organic aluminum compounds having one or more halogen or hydride groups as ethylaluminum dichloride, diethylaluminum chloride, ethylaluminum sesquichloride, and diisobutylaluminum hydride can also be used.

Generally, in order to maximize the catalysts activity and ensure the polymer's best stereoregularity in polymerization of α-olefin, and especially of propylene, external electron donor is widely used. For the electron donor, such organic compounds containing atoms of oxygen, silicon, nitrogen, sulfur, and phosphor as organic acids, organic acid anhydride, organic acid ester, alcohol, ether, aldehyde, ketone, silane, amine, amine oxide, amide, diol, and ester phosphate along with their mixtures can be named. Electron donors of especial usefulness are organosilane compounds, represented by a general formula, $SiR_4$, where, R is represented by $R^1$ or $OR^1$, $R^1$ being an alkyl group having 1 to 20 carbons. The kind includes such aromatic silanes as diphenyl-dimethoxysilane, phenyltrimethoxysilane, phenylethyldimethoxysilane, phenylmethyldimethoxysilane; such aliphatic silanes as isobutyltrimethoxysilane, diisobutyldimethoxysilane, di-t-butyldimethoxysilane, t-buryldimethoxysilane, cyclohexylmethyldimethoxysilane, dicyclopentyldimethoxysilane, dicyclohexyldimethoxysilane, 2-norbomantriethoxysilane, 2-norbornanmethyldimethoxysilane, and their mixtures.

The polymerization reaction can be performed either in gas phase or in bulk in the absence of an organic solvent, or in the state of slurry in the presence of an organic solvent. These reactions are preformed in the absence of oxygen, water, or such compounds as can act as catalytic poison.

In the case of liquid phase reaction, the preferable concentration of the solid complex titanium catalyst (i) is about 0.001 mmol to 5 mmol in terms of the titanium atoms to a liter of the solvent, and more preferably about 0.001 to 0.5 mmol. For the solvent, such alkynes or cycloalkanes as pentane, hexane, heptane, n-octane, isooctane, cyclohexane, and methylcyclohexane; such alkylaromatics as toluene, xylene, ethyl benzene, isopropyl benzene, ethyl toluene, n-propyl benzene, and di-ethyl benzene; such halogenated aromatics as chlorobenzene, chloronaphthalene, and orthodichlorobenzene; and their mixtures are useful.

In gas phase polymerization, the quantity of the solid complex titanium catalyst (i) is from about 0.001 to 5 mmol in terms of the titanium atoms in the catalyst to a liter of the polymerization reactor volume, preferably about 0.001 to 1.0 mmol, and more preferably 0.01 to 0.5 mmol.

The preferable concentration of the organometallic compound (ii) is about 1 to 2,000 mmol to each mole of the titanium atom in the catalyst (i), calculated by the aluminum atom, more preferably about 5 to 500 mol, while the preferable concentration of the organic silicon compound (iii) is about 0.001 to 40 mol to each mole of the aluminum atoms in the organometallic compound (ii), calculated by the silicon atom, more preferably about 0.05 to 30 mol.

The polymerization is performed at sufficiently high temperature, regardless of the polymerization processes. Generally, about 20~200° C. are preferable, and more preferable are about 20~95° C. The monomeric pressure (bar) at the time of polymerization is preferably the atmospheric to 100, and more preferably 2~50.

In the polymerization with the use of the catalyst of the present invention, additives may also be used on occasions for better adjustment of the molecular weight. The principal additive is hydrogen, and its use can be decided upon in accordance with general practices known in the art

EXAMPLE 1

The present invention is further described by means of the examples of its embodiment, but the present invention is not confined or limited to these examples.

The solid complex titanium catalyst is produced by the three following steps:

Step (i): Production of Magnesium Compound Solution

Into a 1.0 L reactor equipped with a mechanical stirrer, replaced with nitrogen atmosphere, a mixture of 15 g of $MgCl_2$, and 4.2 g of $AlCl_3$, and 550 ml of toluene was put and stirred at 400 rpm. 30 ml of tetrahydrofuran, 28.0 ml of butanol, 1.4 ml of ethanol, 1.5 ml of silicon tetraethoxide, and 3.0 ml of tributyl phosphate were added thereto. Then the temperature was raised to 105° C., and the reaction was let to continue for four hours. The thus obtained homogeneous solution was cooled down to room temperature.

Step (ii): Production of Solid Carrier

To a 1.0 L reactor kept at 13° C., said magnesium solution was transferred. While the react content was stirred at 350 rpm, 15.5 ml of $TiCl_4$ was added thereto, and then the temperature of the reactor was raised to 90° C. During this process the solid carrier was formed. At 90° C. the reaction was let to continue for an hour, the stirring was stopped, and the thus formed carrier was let to settle. The supernatant liquid was removed and the solid carrier was washed with 75 ml of toluene.

Step (iii): Production of Catalyst

After adding 100 ml of toluene and 100 ml of $TiCl_4$ to said carrier the temperature of the reactor was raised to 110° C. and it was heated for an hour. Stirring was stopped and after the solid carrier was made to settle down the supernatant liquid was removed, and then 100 ml each of toluene and $TiCl_4$ was poured in, and 2.9 ml of diisobutylphthalate was added thereto. The temperature of the reactor was raised to 120° C., and stirring was continued for an hour. Stirring was stopped, the supernatant liquid removed, and 100 ml of toluene was poured in. The temperature was lowered to 70° C. and stirring was continued for half an hour. After the reaction stirring was stopped, the supernatant liquid was removed, 100 ml of $TiCl_4$ was added, and stirring continued at 70° C. for half an hour. The thus produced catalyst was washed with 100 ml of refined hexane five times. The catalyst was dried in a nitrogen atmosphere and stowed away.

The particle size distribution of the catalyst was measured with a laser particle size analyzer (Mastersizer X, Malvern Instruments), to show a distribution of $d_{10}$=26.2 μm, $d_{50}$=48.1 μm and $d_{90}$=70.7 μm. Here $d_{10}$, $d_{50}$, and $d_{90}$ mean that 10% 50%, and 90% of the particles respectively had particles of less than 26.2 μm, 48.1 μm and 70.7 μm in size, thus indicating that $d_{50}$ is defined as of a medium size.

<Polymerization>

A 2 L high-pressure reactor was dried in an oven, and was assembled while still hot A glass vial containing 27 mg of the catalyst was placed inside this reactor. The reactor was filled with nitrogen and then was evacuated five times in turn, to render the inside of the reactor entirely of nitrogen atmosphere. 1,000 ml of n-hexane was put in the reactor, and then triethylaluminum (aluminum/titanium molar ratio at 450) and cyclohexylmethyldimethoxysilane (silane/aluminum molar ratio 0.1), the latter being external electron donor, were added thereto. Pressure of propylene w applied at 20 psi the vial was broken, and the reaction was made to continue for five minutes, while stirring the reactor. Then 100 ml of hydrogen was added, the temperature of the reaction raised to 70° C., the propylene pressure adjusted to 100 psi, and the reaction was let to continue for an hour. After the polymerization, the temperature of the reactor was lowered to room temperature, and a small quantity of ethanol solution was added to the polymerized matter. The thus produced polymer was collected by separation and dried inside a vacuum oven at 50° C. for at least six hours, finally to obtain polypropylene in white powder.

The polymerization activity, calculated by measuring tie weight (g) of the catalyst and the weight (kg) of the thus produced polymer (kg of polypropylene divided by g of catalyst) was 6.9, while the stereoregularity, calculated in terms of the ratio of the total polymer weight (g) to the weight of the polymer which was not extracted by boiling n-heptane in 4 hours was 99.4%.

EXAMPLE 2

The catalyst was prepared in the same way as in Example 1, except that in Step (i) of production of the magnesium solution 2.1 g of $AlCl_3$ was used.

The produced catalysts particle size distribution was $d_{10}$=29.3 μm, $d_{50}$=53.6 μm, $d_{90}$=89.7 μm. The catalyst's polymerization activity was 6.5 kg polypropylene/g catalyst, and the polymers stereoregularity was 99.4%.

COMPARATIVE EXAMPLE 1

The catalyst was prepared in the same way as in Example 1, except that in Step (i) of production of the solution $AlCl_3$ was not used. The obtained catalyst's particle size distribution was $d_{10}$=27.3 μm, $d_{50}$=45.9 μm, $d_{90}$=77.6 μm. The catalytic activity was 7.9 kg polypropylene/g catalyst, and the polymer's stereoregularity as 93.4%.

EXAMPLE 3

The catalyst was prepared in the same way as in Example 1, only except that when producing the magnesium solution tetrahydrofuran was increased to 37 ml.

The obtained catalysts particle size distribution was $d_{10}$=25.9 μm, $d_{50}$=39.3 μm, $d_{50}$=63.7 μm. The catalytic activity was 7.97 kg polypropylene/g catalyst, and the polymer's stereoregularity was 98.8%.

EXAMPLE 4

The catalyst was prepared in the same way as in Example 1, except that when producing the magnesium solution silicon tetraethoxide was increased to 3.2 ml.

The obtained catalysts particle size distribution was $d_{10}$=31.5 μm, $d_{50}$=50.2 μm, $d_{90}$=86.4 μm. The catalytic activity was 6.9 kg polypropylene/g catalyst and the polymer's stereoregularity was 99.3%.

EXAMPLE 5

The catalyst was prepared in the same way as in Example 1, except that when producing the magnesium solution silicon tetraethoxide was increased to 6.4 ml.

The obtained catalyst's particle size distribution was $d_{10}$=27.8 μm, $d_{50}$=52.2 μm, $d_{90}$=89.2 μm. The catalytic activity was 6.2 kg polypropylene/g catalyst, and the polymers stereoregularity was 99.1%.

COMPARATIVE EXAMPLE 2

The catalyst was prepared in the same way as in Example 1, except that when producing the magnesium solution silicon tetraethoxide was not used.

The obtained catalyst's particle size distribution was $d_{10}$=30.4 μm, $d_{50}$=50.9 μm, $d_{90}$=87.9 μm. The catalytic activity was 4.2 kg polypropylene/g catalyst, and the polymer's stereoregularity was 96.8%.

EXAMPLE 6

The catalyst was prepared in the same way as in Example 1, except that when producing the magnesium solution tributyl phosphate was decreased to 1.5 ml.

The obtained catalyst's particle size distribution was $d_{10}$=28.4 μm, $d_{50}$=46.5 μm, $d_{90}$=81.5 μm. The catalytic activity was 6.1 kg polypropylene/g catalyst, and the polymers stereoregularity was 99.2%.

EXAMPLE 7

The catalyst was prepared in the same way as in Example 1, except that when producing the magnesium solution tributyl phosphate was increased to 4.5 ml.

The obtained catalyst's particle size distribution was $d_{10}$=25.9 μm, $d_{50}$=45.7 μm, $d_{90}$=80.6 μm. The catalytic activity was 5.7 kg polypropylene/g catalyst, and the polymer's stereoregularity was 99.0%.

COMPARATIVE EXAMPLE 3

The catalyst was prepared in the same way as in Example 1, except that when producing the magnesium solution tributyl phosphate was not used.

The obtained catalyst's particle size distribution was $d_{10}$=23.9 μm, $d_{50}$=47.7 μm, $d_{90}$=85.6 μm. The catalytic activity was 3.8 kg polypropylene/g catalyst, and the polymer's stereoregularity was 98.5%.

EXAMPLE 8

The catalyst was prepared in the same way as in Example 1, except that when producing the sold catalyst carrier in step(ii). $TiCl_4$ was increased to 18.0 ml.

The obtained catalyst's particle size distribution was $d_{10}$=26.8 μm, $d_{50}$=48.2 μm, $d_{90}$=97.6 μm. The catalytic activity was 6.9 kg polypropylene/g catalyst, and the polymer's stereoregularity was 99.5%.

EXAMPLE 9

The catalyst was prepared in the same way as in Example 1, except that when producing the solid catalyst carrier in step(ii), 8.1 ml of $SiCl_4$ and 7.8 ml of $TiCl_4$ was used.

The obtained catalyst's particle size distribution was $d_{10}$=17.8 μm, $d_{50}$=28.2 μm, $d_{90}$=52.8 μm. The catalytic activity was 7.2 kg polypropylene catalyst, and the polymer's stereoregularity was 99.4%.

COMPARATIVE EXAMPLE 4

Step (i): Production of Magnesium Compound Solution

Into a 1.0 L reactor equipped with a mechanical stirrer and replaced with nitrogen atmosphere, 5 g of $MgCl_2$ and 400 ml of tetrahydrofuran were added, and the mixture was stirred at 400 rpm. The temperature was raised to the boiling point of tetrahydrofuran to completely dissolve $MgCl_2$, and the homogeneous solution obtained this way was cooled to room temperature.

Step (ii): Production of Solid Carrier

To a 1.0 L reactor kept at 13° C., said magnesium solution was transferred. While the react contact was stirred at 350 rpm, 30 ml of $TiCl_4$ was added to said solution, and then the temperature of the reactor was raised to 90° C. After having the reaction continue at 90° C. for an hour, stirring was stopped, and the solid matter was let to settle down. Then the supernatant liquid was removed, and the solid part was washed with 75 ml of hexane.

Step (iii): Production of Catalyst 150 ml of heptane and 120 ml of $TiCl_4$ were transferred into the reactor and the temperature of the reactor was raised to 80° C. Then 1.97 ml of diisobutyl phthalate was added at that temperature, and the temperature of the reactor was raised to 100° C., to be heated for two hours. Stirring was stopped, the solid matter allowed to settle down, the supernatant liquid removed, and then the solid matter was washed in 100 ml of hexane five times. The thus made catalyst was dried in nitrogen atmosphere and stowed away. The catalyst's particle size distribution was $d_{10}$=6.8 μm, $d_{50}$=14.8 μm, and $d_{90}$=27.8 μm, but the particles showed irregular shapes.

<Polymerization>

Propylene polymerization was conducted in the same way as in Example 1 with the same amount in terms of the titanium atoms in the solid complex catalyst as in that example. The polymerization activity was 5.5 kg polypropylene/g catalyst and the polymer's stereoregularity 95.70%.

COMPARATIVE EXAMPLE 5

Step (i): Production of a Magnesium Compound Solution

A mixture of 15 g of $MgCl_2$ and 150 ml of n-decane was put in a 1.0 L reactor, equipped with a mechanical stirrer, replaced with nitrogen atmosphere, and it was stirred at 400 rpm, and then 75 ml of 2-ethyl-1-hexanol was added thereto. The temperature was raised to 120° C., and the reaction was let to continue for two hours, and then 6 ml of diisobutylphthalate was transferred to the reactor and the reaction was let to continue for an hour. The thus obtained homogeneous solution was cooled to room temperature.

Step (ii): Production of Solid Carrier

To a 1.0 L reactor, kept at 13° C., the above magnesium compound solution was transferred. Stirring set at 350 rpm 30 ml of $TiCl_4$ was added, and the reaction temperature was raised to 90° C. The reaction was let to continue at that temperature for an hour, then the stirring was stopped to let the solid matter settle down. The supernatant liquid was removed and the solid matter was washed with 75 ml of hexane twice.

Step (iii): Production of Catalyst

To the above solid matter 150 ml of heptane and 120 ml of $TiCl_4$ were added, and the temperature of the reactor was raised to 80° C. At that temperature 5.6 ml of diisophthalate was added and the temperature was raised to 100° C. Heating continued for two hours theater. Stirring was stopped to let the solid matter settle down. The supernatant liquid was removed, and the solid matter was washed with 100 ml of refined hexane five times. The catalyst was dried in a nitrogen atmosphere and stowed away. The thus obtained catalyst's particle size distribution was $d_{10}$=8.7 μm, $d_{50}$=16.8 μm, $d_{90}$=35.4 μm, but the morphology of the catalyst was irregular.

<Polymerization>

Propylene polymerization was performed in the same way as in Example 1 with the same amount in terms of the titanium atoms in the solid complex catalyst as in that example. The polymerization activity was 4.9 kg polypropylene/g catalyst, and the polymer's stereoregularity 96.3%.

The catalyst of the present invention is simple in production process, having a large average particle size and a narrow particle size distribution. The catalyst activity is high and the polymer produced with the use of the catalyst is excellent in its stereoregularity.

What is claimed is:

1. A method of producing a solid titanium catalyst for homo-polymerization and co-polymerization of an α-olefin comprising:

(i) preparing a magnesium compound solution by dissolving a magnesium halide compound and a compound of Group IIIA of the Periodic Table in a mixed solvent comprising a cyclic ether, one or more alcohols, a phosphorous compound and an organic silane;

(ii) reacting the magnesium compound solution with a transition metal compound, a silicon compound, or a mixture thereof, and then precipitating the solid particles; and (iii) reacting the precipitated solid particles with a titanium compound and an electron donor.

2. A method of producing a solid titanium catalyst according to claim 1, wherein said compound of Group IIIA of the Periodic Table comprises aluminum halide, and wherein 0.25 mol aluminum halide or less per mole of said magnesium halide is dissolved in the mixed solvent.

3. A method of producing a solid titanium catalyst according to claim 1, wherein said cyclic ether comprises 2 to 5 carbons atoms, and at least one alcohol comprises 1 to 20 carbon atoms.

4. A method of producing a solid titanium catalyst according to claim 1, wherein the molar ratio of said magnesium halide compound to the total of said cyclic ether and said one or more types of alcohol is 1:0.5 to 1:20, and the molar ratio of said cyclic ether to said one or more types of alcohol is 1:0.05 to 1:0.95.

5. A method of producing a solid titanium catalyst according to claim 1, wherein the one or more alcohols comprise:

a first alcohol comprising 1 to 3 carbon atoms; and a second alcohol comprising 4 to 20 carbon atoms, wherein the molar ratio of the total amount of alcohols to the first alcohol is 1:0.1 to 1:0.4.

6. A method of producing a solid titanium catalyst according to claim 5, wherein said alcohol having a relatively large molecular weight is selected from the group comprising butanol, isoamyl alcohol, and 2-ethylhexanol, and said alcohol having a relatively small molecular weight is selected from the group comprising methanol and ethanol.

7. A method of producing a solid titanium catalyst according to claim 1, wherein said phosphorous compound is represented by a general formula of $PX_aR^1_b(OR^2)_c$ or $POX_dR^3_e(OR^4)_f$, wherein X is a halogen atom, and wherein $R^1$, $R^2$, $R^3$, or $R^4$, are independently a hydrocarbon having 1 to 20 carbon atoms, which is selected from the group consisting of alkyl, alkenyl, aryl, and wherein a+b+c=3, $0 \leq a \leq 3$, $0 \leq b \leq 3$, $0 \leq c \leq 3$, d+e+f=3, $0 \leq d \leq 3$, $0 \leq e \leq 3$, and $0 \leq f \leq 3$.

8. A method of producing a solid titanium catalyst according to claim 1, wherein said mixed solvent comprises 0.01 to 0.25 mol of said phosphorous compound per mole of said magnesium halide compound.

9. A method of producing a solid titanium catalyst according to claim 1, wherein said organic silane is represented by a general formula of $R_nSiR^1_{4-n}$, and wherein R comprises a hydrogen, an alkyl, alkoxy, halo alkyl, or aryl group comprising 1 to 10 carbons atoms; or a halosilane or halosilyl alkyl group comprising 1 to 8 carbons atoms; and wherein $R^1$ comprises OR or halogen, and wherein n comprises 0 to 4.

10. A method of producing a solid titanium catalyst according to claim 1, wherein said mixed solvent comprises 0.01 to 0.25 mol of said organic silane per mole of said magnesium halide compound.

11. A method of producing a solid titanium catalyst according to claim 1, wherein said transition metal compound in Step (ii) comprises a compound represented by a general formula of $Ti(OR)_aX_{4-a}$, and wherein R comprises hydrogen, and wherein X comprises a halogen atom, and wherein a is 0 to 3.

12. A method of producing a solid titanium catalyst according to claim 1, wherein said silicon compound in Step (ii) comprises a compound represented by a general formula of $R_nSiR^1_{4-n}$, wherein R comprises hydrogen; or an alkyl, alkoxy, haloalkyl, or an aryl group having 1 to 10 carbons atoms; or halosilyl or halosilyl group comprising 1 to 8 carbon atoms; and wherein $R^1$ comprises halogen; and wherein n comprises 0 to 3.

13. A method of producing a solid titanium catalyst according to claim 1, wherein said transition metal compound in Step (ii) comprises titanium tetrachloride.

14. A method of producing a solid titanium catalyst according to claim 1, wherein said titanium compound in Step (iii) comprises titanium tetrachloride.

15. A method of producing a solid titanium catalyst according to claim 1, wherein said electron donor in Step (iii) comprises dialkylphthalate.

* * * * *